Oct. 28, 1952  J. M. GWIN ET AL  2,615,187
APPARATUS FOR CLEANING EGGS
Filed Jan. 14, 1948  3 Sheets-Sheet 1
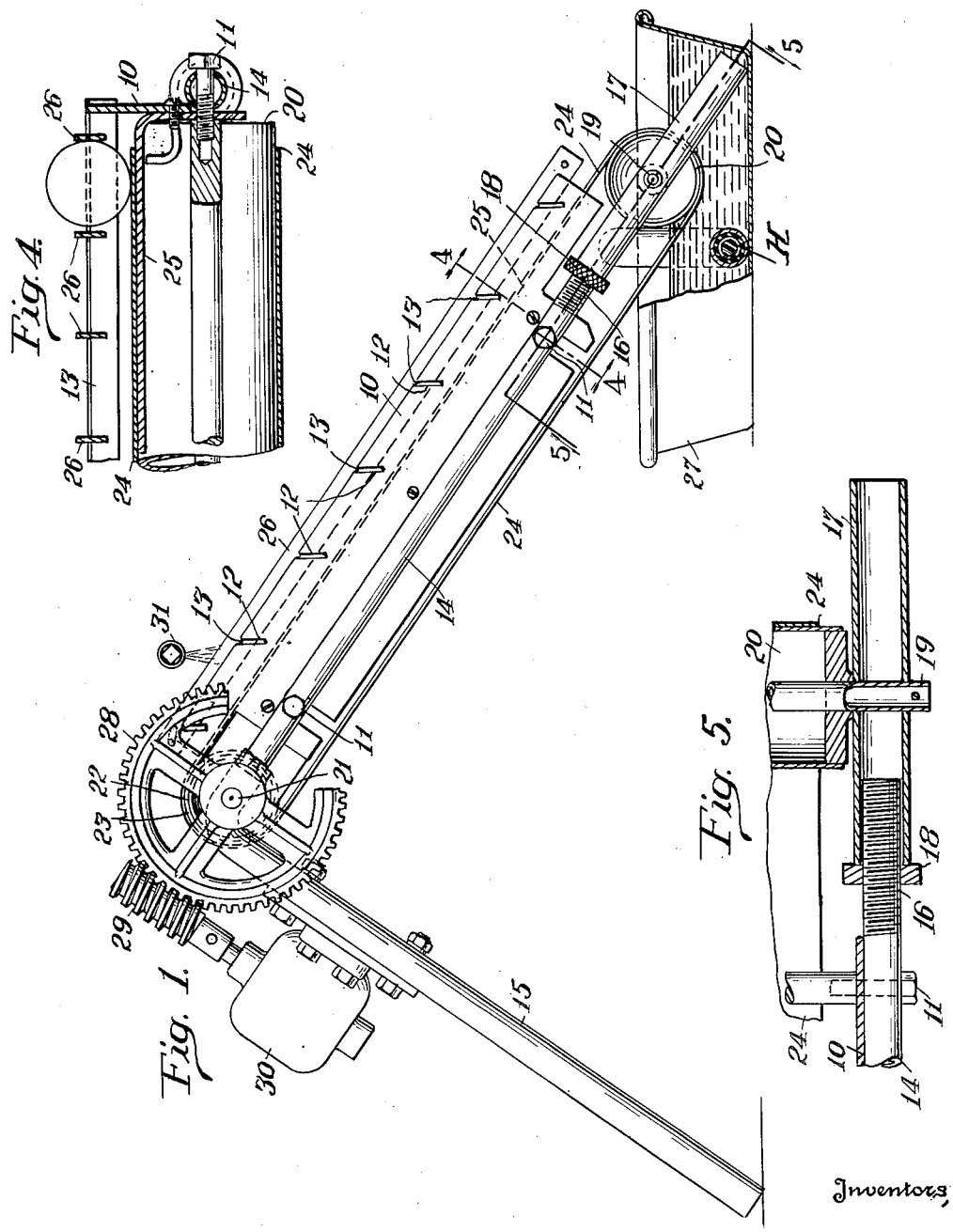
Inventors,
James M. Gwin
Dean R. Gwin
Attorney

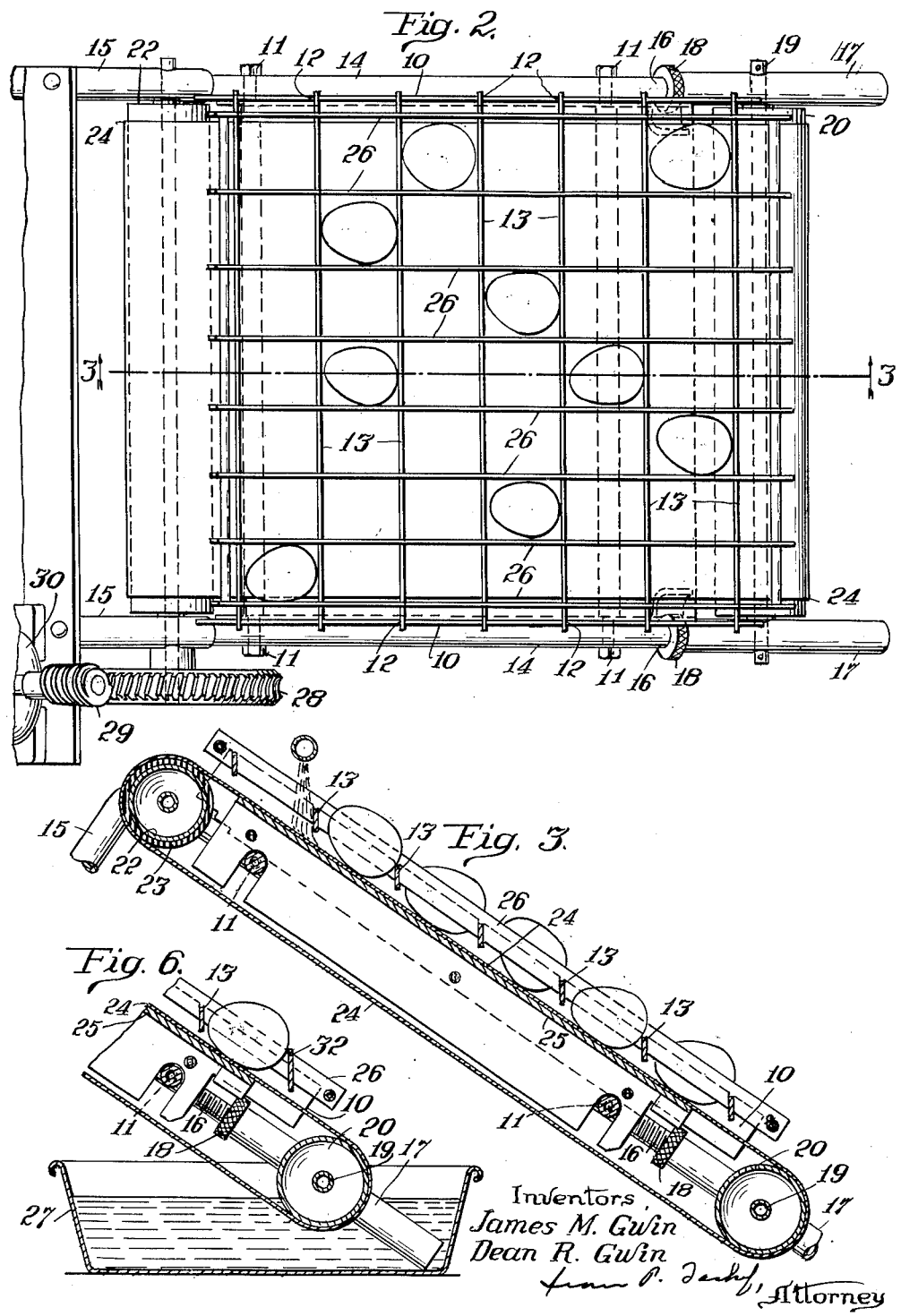

Oct. 28, 1952     J. M. GWIN ET AL     2,615,187
APPARATUS FOR CLEANING EGGS
Filed Jan. 14, 1948     3 Sheets-Sheet 3
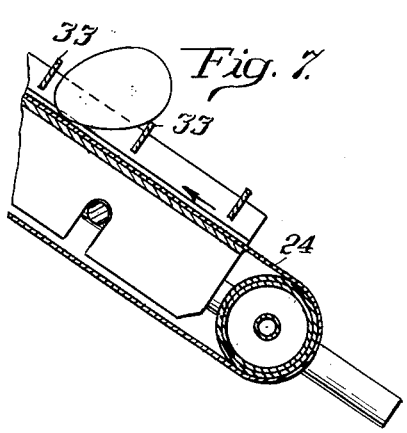
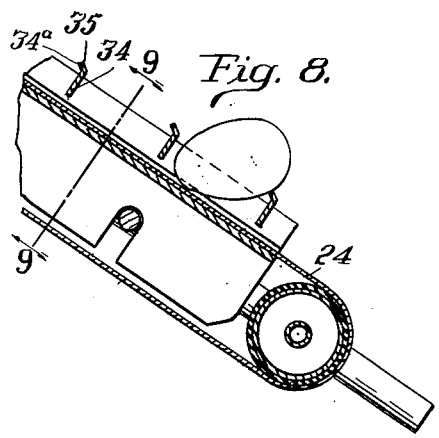
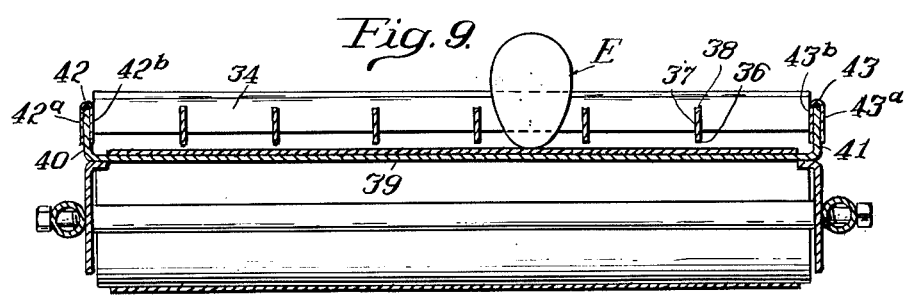
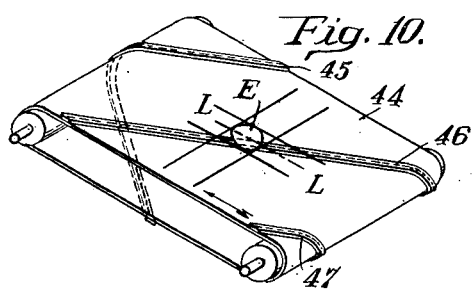
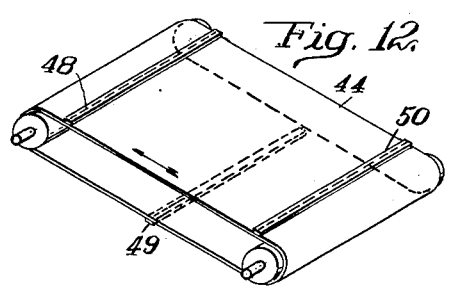
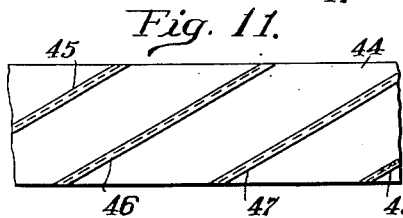
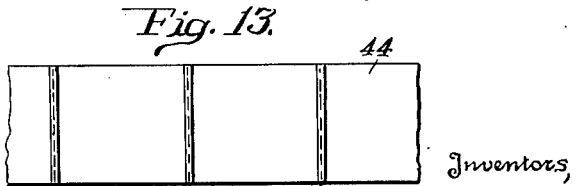

Patented Oct. 28, 1952

2,615,187

UNITED STATES PATENT OFFICE 2,615,187

APPARATUS FOR CLEANING EGGS

James M. Gwin, Hyattsville, Md., and
Dean R. Gwin, Tyrone, Pa.

Application January 14, 1948, Serial No. 2,214

3 Claims. (Cl. 15—3.12)

This invention relates to the cleaning of eggs. This invention more particularly relates to a method of and apparatus for cleaning shell eggs and more especially poultry eggs. A certain percentage of shell eggs, as they come from the nests, frequently have thereon adhering solid dirt which may be chicken manure, nesting material, or coagulated blood or the substance of an egg which has broken in the nest. Further, chickens in rainy weather may lay eggs on the open range or on the surface layers of yards and the so-laid eggs will have mud or other earthy materials adhering thereto. Additionally, the eggs in commercial handling may accumulate a certain amount of dirt.

It is well known that to clean eggs contaminated with adhering debris, the cleaning is effected mostly by revolving brushes.

In accordance with the present invention, it is proposed to introduce an entirely new principle in the cleaning of eggs, namely, to scrape the dirt from the egg shell as the egg revolves on its longer axis and tends to rotate on its shorter axis.

With the application of this invention, it is proposed to simultaneously clean the egg by having it rest on a traveling belt surface which is at least moist and which is continuously maintained moist although it may have a film of water or other liquid material thereon.

With the above and other objects in view, as will presently be apparent, the invention consists in general of certain novel details of construction and combination of what is hereinafter fully described and particularly claimed.

In the accompanying drawings, like characters of reference indicate like parts in the several views, and:

Figure 1 is a side view of the complete apparatus;

Figure 2 is a plan view thereof;

Figure 3 is a section on line 3—3 of Figure 2;

Figure 4 is a fragmentary section on line 4—4 of Figure 1;

Figure 5 is an enlarged section on line 5—5 of Figure 1;

Figure 6 is a view similar to Figure 3 but showing the lower part of the apparatus with a slight modification of certain scraping means used herein;

Figure 7 is a fragmentary longitudinal section taken on the lower portion of the egg cleaning device showing a modification wherein the transverse scraper bars are positioned at right angles to the plane of the cleaning belt;

Figure 8 is a further modification of the egg cleaning apparatus showing a bent scraping bar;

Figure 9 is a cross-sectional view on line 9—9 of Figure 8;

Figure 10 is a perspective view showing a modified belt provided with means for jarring or bouncing and imparting a turning movement to the egg as it is being cleaned, where the latter exhibits a tendency during the period of cleaning to cling to the scraping bar;

Figure 11 is a developed view of the belt set forth in Figure 10;

Figure 12 shows a further modification of the belt; and

Figure 13 is a developed view of the belt set forth in Figure 12.

In the embodiment of the invention as here shown, there is provided a pair of laterally spaced side members or frames 10 which are held in proper spaced relation by transversely extending bolts 11. These side members are slotted at 12 and receive the ends of scraper bars 13. Below the slotted portion of the side members is a pair of supporting bars or members 14 and these members 14 are supported in an inclined position by supporting legs 15.

The supporting bars 14 have threaded portions 16, whereon are fitted tubular feet 17 so that the length of the bars 14 may be adjusted, and as the legs 15 are not adjustable, the angle of inclination of the bars 14 may be changed, a lock nut 18 being provided for the purpose of preventing change in such adjustment other than that desired by the operator.

At the lower end of the feet portions of the supporting bars is a shaft 19 carrying a belt pulley 20. Similarly, at the upper end of the inclined device is a shaft 21 carrying a belt pulley 22 provided with a friction coating 23. Around these pulleys 20 and 22 is trained a belt 24, and beneath the upper run of this belt is a supporting plate 25, which runs from side to side of the belt and extends beneath the various divisions made by the transverse scraper members 13. The scrapers 13 divide the space over the belt into substantially equal transverse runs and interlocking with the transverse members 13 are bars 26 which may be rigid or flexible, said bars dividing the space over the belt into a series of cells, as shown best in Figure 2. It is to be observed that these egg receiving cells or chambers are preferably graduated in width so that eggs of various sizes may be accommodated in proper manner for maximum cleaning efficiency.

In accordance with the present invention, the egg is cleaned while the egg rests on a traveling belt which is wetted with a cleaning liquid. While it is within the broad scope of the present invention to have the belt travel horizontally, it has been found that the best cleaning effect is not obtained when the belt is traveling horizontally and, therefore, in the best and most satisfactory form of the invention, the belt is inclined at an angle to the horizontal. It is further desired to point out that experiments indicate that the angle of inclination of the belt is of considerable importance.

When the belt is traveling horizontally, that is, is not inclined, the egg tends to move away from the scraping surface and efficient cleaning action is at least somewhat inhibited. Of course, if the belt is vertical, the egg cannot be held on the belt between the confined walls of an egg receiving chamber.

As stated, experiments show that it is best to incline the belt, and this inclination will depend at least in part upon the speed of travel of the belt. Not only is it best to have the belt travel in an inclined path, but the angle of inclination influences to a substantial extent the efficient cleaning action of the apparatus.

While it has been stated that it is preferred to have the belt inclined as the maximum cleaning effect is not obtained when the belt is substantially horizontal, it is recognized that the invention will work with the horizontal belt, but the maximum amount of cleaning will not be achieved.

When the belt is inclined, the egg is cleaned due to the egg shell contacting the upper edge of the lower scraping bar and as the angle of inclination increases, the weight of the egg exerts more pressure against the edge of the lower scraping bar. In other words, the weight of the egg when the belt is horizontal rests entirely on the belt and this may be described as the horizontal weight component.

If the belt is vertical, the weight of the egg or the vertical weight component will rest against the scraping bar. When the egg is inclined, the resulting weight component will vary according to the inclination of the belt, and a greater proportion of the resulting weight will exert its weight pressure against the scraping edge of the scraping bar as the angle of inclination of the belt is increased. However, experience has shown that the most favorable angle of inclination of the belt with the horizontal varies between 15° and 45°.

It may be pointed out that when the belt is horizontal and the belt is traveling, the egg will scrape against the scraping edge of the forward scraping bar, and this will effect a cleaning of the egg. For example, if the belt 24 as shown in Figure 7, traveling in the direction of the arrow, is brought to a horizontal position, the egg will then scrape against the upper scraping bar 33 instead of the lower scraping bar 33 and the egg will have a combined motion due to a turning movement on its longer axis and on its shorter axis.

It is obvious that the speed of travel of the belt may vary greatly. However, most satisfactory results have been obtained when the belt has a speed varying between about 40 and 65 feet per minute. However, if the belt is traveling too fast, the eggs will bump and will check, crack or break, and if the belt is traveling too slowly, the cleaning action of the apparatus is greatly reduced. Therefore, the rate of travel for the belt herein set forth is preferred, but obviously it is not desired to be limited to this specific rate of travel as this may be greatly varied and may be less than set forth or considerably more. The speed of travel will depend to a large extent on the character of the eggs being cleaned, the hardness of the egg shells, the character of the cleaning liquid with which the belt is moistened and many other factors.

The eggs are enclosed in the respective chambers, or cells, and the side walls 26 may be flexible or rigid. Irrespective of whether the side walls 26 are rigid or flexible, it is desirable to have a clearance between the longitudinal sides of the eggs and the longitudinal confining guide walls of the chamber members. If there is no clearance, there is a tendency for the eggs to get stuck, and if there is too great a clearance, the eggs tend not to be cleaned all over but only to be cleaned in localized areas. In other words, if the clearance is too much, the egg tends to turn partially or fully sideways so that the egg is revolved on its long axis L—L, and the butt end and pointed end of the egg is not cleaned and, further, only portions of the side areas of the egg are cleaned.

The scraping means or edges are formed on the cross-bars, a plurality of which are located immediately above and adjacent the belt. While the scraping bars may be inclined, as shown in Figures 1-6, inclusive, as later pointed out in detail and shown in Figures 7 and 8, the scraping bars may be positioned at substantially right angles to the plane of the belt. The scraping bars should have relatively sharp scraping edges in order to scrape the maximum amount of debris from the eggs. However, the edges may be somewhat rounded and still primarily function as a scraping means when in contact with the shell of the eggs. The cross-bars may be made of metal, metal alloys, plastic materials, and even wood, although obviously the wood will wear out in a shorter time than the metals and will ultimately have to be replaced.

The belt 24 may be made of any of the belt materials now on the market as, for example, canvas, rubber or any material that has a good wiping effect, such as Turkish toweling. The belt should be of such character that the capillary film of liquid or moisture will adhere to the surface of the belt. The belt 24 dips into a moistening supply pan 27 and a very substantial portion of this liquid medium is retained by the belt.

Instead of using water as a cleaning medium, an aqueous solution of any of the cleaning agents now on the market may be used, said liquids having a low surface tension.

The temperature of the cleaning medium may vary considerably and apparently does not affect the results obtained except that if the water is warm, there is a somewhat better cleaning effect. Usually and preferably the temperature will vary between room temperature, which is 20° C., and approximately boiling, of 100° C., or just a little less, as for example, 95° to 98° C. The cleansing medium in the pan 27, which may be water or a dilute aqueous solution of chemical compounds, may be at the boiling point, but by the time the cleansing or washing medium is applied to the eggs, the temperature of the cleansing or washing medium is considerably below the boiling point of the cleansing or washing medium.

The temperature of the washing medium should be such so that under the conditions that the egg is cleaned, the albumen content of the liquid egg shall not be coagulated. It is known that the albumen of the liquid content of the egg is coagulated at a temperature between 140° F. and 150° F. However, the washing medium can be much hotter because the washing medium is carried onto the belt and the washing medium only touches the egg at a given specific time at a localized area.

Fixed on the shaft 21 is a worm gear wheel 28 wherewith engages a worm 29, driven by any form of prime mover as, for example, an electric motor 30, to thereby move the belt at a speed which will efficiently clean the eggs while preventing checking or cracking of the eggs. The belt speed should be such that the moistening agent will have ample time to dampen the eggs as they are rolled over and over against the scrapers to thereby expose the entire area of the eggs to the scraping action.

It is to be noted that the eggs, while turning on their longitudinal axes, simultaneously turn on their transverse axes so that all parts of the eggs are thoroughly moistened and scraped. Stated differently, if the eggs revolve on their short axes, first the butt end of the egg would be exposed to the scraping action and then the material between the butt end and the pointed end, and then the pointed end would be exposed to the scraping action. When the egg is said to turn or revolve on its long axis, the sides of the eggs between the butt end and the pointed end are being cleaned. It is clear from the herein set forth description that these respective cleaning motions occur simultaneously so that the egg does not strictly turn on its longitudinal axis or turn on its transverse axis, but has a motion which is resultant of the two.

In some cases it may be found desirable to mount over the upper end of the belt a spray pipe 31 and, of course, there will be a connection of the spray pipe to a suitable supply of the moistening liquid.

In the modification of the invention shown in Figure 6, it will be noted that there is provided at the lower end of the side frame a scraper bar 32, which is of greater vertical extent than the scraper bars 13. As is well known, certain eggs are longer measured along the longitudinal axis than other eggs. Eggs which have a length along the longitudinal axis greater than the average length are placed in the lower tier of chambers or egg-pockets, said lower tier having the scraper bar 32 extending upwardly as shown. The tendency of these eggs to jump the lower scraper bars is minimized or entirely inhibited. This tendency for some of the long eggs to over-ride the lower scraper bar usually occurs when the machine is running at its maximum cleaning speed as herein set forth. It is not necessary in this form of the invention to have the scraper bars in the upper tiers or rows as high as the scraper bar 32 because the long eggs are purposely placed in the lowermost egg cleaning row or tier and not in the upper rows or tiers. It is possible to have this selective positioning of the eggs because there are relatively few eggs which are so long as to make it desirable to place them in the lowermost egg cleaning row or tier. It is not intended by the above to limit the present method or apparatus to the utilization of a scraper bar 32 of the character set forth. However, this arrangement does have the advantages set forth and can be utilized if the length of the eggs makes its utilization desirable.

In accordance with the disclosure of Figure 7, the scraper bars 33 are positioned at substantially right angles to the surface of the belt 24 instead of being inclined, as shown in Figures 1 and 3.

As shown in Figure 8, each scraper bar 34 is provided with a lip 35 projecting at an angle from the straight portion of the cross-bar. The guide bars 36, as shown in Figure 9, are desirably composed of a relatively thin strip of metal. The guide bars 36 are composed of a flexible metal which may flex somewhat to accommodate an egg of a minutely larger size than the cell itself defined by the scraper bars and the successive guide bars 36.

The guide bars 36 are made of rigid material so that the egg cells or chambers are maintained at a predetermined size.

Both the scrapers and the guide bars are preferably made of a non-rusting material which will not leave a noticeable mark on the egg being cleaned. For this reason aluminum members cannot be used.

The scraper bars 13, 33 and 34 are preferably made of sheet copper or any other similarly workable metal or metal alloy. However, as stated, non-metal materials may be used for the scraping bars and also for the guide bars.

It is desired to maintain the edge 34a reasonably sharp. This may be accomplished by using a comparatively thin member and having the scraping edge bend at an angle. This also functions to strengthen the scraping bar.

The egg cell member is preferably made of a series of scraping bars 34 which extend transversely of the guide bars 36. Each guide bar is cut or slitted as at 37 and into these slits 37 the scraping bar is inserted, and at each junction point the scraper bar and the guide bar are fastened together by any suitable means but preferably by welding, as by a weld 38.

As shown in Figure 9 a belt support 39 is provided, said support having walls 40 and 41. The egg-receiving unit is also provided with side members 42 and 43 in the shape of an inverted U, having side walls 42a and 42b and 43a and 43b, respectively. The belt support side walls 40 and 41 have telescoped therein the side walls 42 and 43. This structure provides a unitary egg-receiving cell unit which can easily be removed for cleaning or removing the belt and for the cleaning of the egg-receiving cell unit itself.

As shown in Figures 10–13, inclusive, the belt 44 is provided with raised portions or protuberances 45, 46 and 47 which extend diagonally across the belt. The protuberances may be termed riffles, and said riffles or protuberances project from the surface of the belt in sufficient amount to jar or bump the eggs as the belt travels under the eggs, said belt having previously passed through a liquid bath and is therefore provided with a film of liquid or water of capillary magnitude which functions to assist in cleaning the egg.

As shown in Figures 10–12, inclusive, the belt is traveling in the direction of the arrow and the egg E when contacted by the raised strip or riffle is caused to turn on its long axis L—L in a counter-clockwise direction. These riffles or raised strips function to insure the entire surface of the egg being brought in contact with the scraping bar to clean the same. Many eggs have such a contour as to be substantially entirely clean when the belt has a plane surface but the utilization of a belt with an interrupting surface of the character herein set forth insures substantially complete cleaning of the egg.

Instead of having the riffles or protuberances running diagonally of the plane of the belt, as shown in Figure 10, said riffles or protuberances may extend at right angles to the plane of travel of the belt, as shown in Figure 12, the latter being provided with riffles 48, 49 and 50. When the riffles extend transversely across the belt, as shown in Figure 12, said riffles function only to jar or bump the eggs and do not impart any special movement to the eggs along axis L—L of the eggs. As previously pointed out, the riffles, when positioned as shown in Figure 10, do assist in effecting a turning movement of the eggs around the long axis thereof.

These riffles may be made of textile material stitched to the surface of the belt, or may be made of a plastic material, but obviously a material which has the springiness and give of a textile material is preferable so as to reduce the cracking or checking of the eggs to a minimum.

These riffles may extend just slightly above the surface of the belt as, for example, $\frac{3}{32}$ and $\frac{1}{64}$ of an inch. Obviously, however, the height of the riffles is not limited to the figures specified. The height should be sufficient to perform the functions herein set forth.

The liquid medium in the supply pan 27 may be heated by means of an electrical heating element H.

What is claimed is:

1. In a device of the kind described, an inclined cellular egg-receiving structure having an upper portion and a lower portion, the cells of the structure being formed by spaced intersecting longitudinally extending and transversely extending members, each of the latter being provided with a scraping edge, the transverse members disposed in the lower portion of the cellular egg-receiving structure having a height greater than the transverse members in the upper portion of the structure, each of the cells in the lower portion of the structure being adapted to reecive an egg of the length measured along its longitudinal axis greater than the length of the average egg measured along its longitudinal axis, an egg-supporting traveling belt having an upper run extending beneath said structure and constantly moving upwardly of the inclination of the structure to rotate eggs in the cellular structure against said scraping edges, and means to constantly supply said belt with moisture whereby to wet the surfaces of the eggs to be scraped.

2. In a device of the kind described, an inclined cellular egg-receiving structure having an upper portion and a lower portion, the cells of the structure being formed by spaced intersecting longitudinally extending and transversely extending members, each of the latter being provided with a scraping edge, the transverse members disposed in the lower portion of the cellular egg-receiving structure having a height greater than the transverse members in the upper portion of the structure, each of the cells in the lower portion of the structure being adapted to receive an egg of the length measured along its longitudinal axis greater than the length of the average egg measured along its longitudinal axis, an egg-supporting traveling belt having an upper run extending beneath said structure and constantly moving upwardly of the inclination of the structure to rotate eggs in the cellular structure against said scraping edges, means to periodically jar said eggs as they are cleaned and inhibit the tendency of the eggs to cling to the scraping edges and means to constantly supply said belt with moisture whereby to wet the surfaces of the eggs to be scraped.

3. In a device of the kind described, an inclined cellular egg-receiving structure, the cells of the structure being formed by spaced longitudinally extending side walls which interlock with spaced transversely extending walls, each of the latter being provided with a scraping edge, an egg-supporting traveling belt having an upper run extending beneath said cell-receiving structure, said transversely extending members, each of which is provided with a scraping edge, being disposed at an angle to the run of said traveling belt, the latter constantly moving upwardly of the inclination of the structure to rotate eggs in the cellular structure against said scraping edges, each egg being disposed on an incline and exerting pressure against its respective scraping edge, means to constantly supply said belt with moisture thereby to wet the surfaces of the eggs to be scraped, and means to periodically jar the eggs as they are cleaned to inhibit the tendency of the eggs to cling to the scraping edges, said means comprising a series of spaced ripples disposed across the surface of the belt.

JAMES M. GWIN.
DEAN R. GWIN.

REFERENCES CITED

The following references are of record in the file of this patent:

UNITED STATES PATENTS

| Number | Name | Date |
|---|---|---|
| 604,621 | Kunkel | May 24, 1898 |
| 649,652 | Douglas | May 15, 1900 |
| 1,505,484 | Mulvany et al. | Aug. 19, 1924 |
| 1,530,415 | Roussel | Mar. 17, 1925 |
| 1,736,813 | Zuckerman | Nov. 26, 1929 |
| 1,776,784 | Cramer | Sept. 30, 1930 |
| 1,964,295 | Miller et al. | June 26, 1934 |
| 2,087,844 | Hansen | July 20, 1937 |
| 2,096,228 | Dudgeon | Oct. 19, 1937 |
| 2,301,931 | Davis | Nov. 17, 1942 |
| 2,371,867 | Bayles | Mar. 20, 1945 |
| 2,408,648 | Inman | Oct. 1, 1946 |
| 2,502,728 | Johnson | Apr. 4, 1950 |